(12) United States Patent
Matsuoka (10) Patent No.: US 7,958,630 B2
(45) Date of Patent: Jun. 14, 2011

(54) METHOD FOR PRODUCING A DEVICE CONNECTOR

(75) Inventor: Hiroyuki Matsuoka, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 12/765,082

(22) Filed: Apr. 22, 2010

(65) Prior Publication Data

US 2010/0297864 A1 Nov. 25, 2010

(30) Foreign Application Priority Data

May 21, 2009 (JP) ................................. 2009-123245

(51) Int. Cl.
*H01K 3/22* (2006.01)
*B28K 5/00* (2006.01)

(52) U.S. Cl. ............... 29/848; 29/747; 29/845; 29/846; 29/426.4; 29/462.6; 264/250

(58) Field of Classification Search ............ 29/848, 29/845, 846, 854, 956, 857, 747, 33 M, 426.4, 29/426.6; 264/404, 278, 272.15, 272.11, 264/272.16, 273, 275, 250; 425/517, 129.1; 439/271, 731
See application file for complete search history.

(56) References Cited

U.S. PATENT DOCUMENTS

| 5,926,852 | A | * | 7/1999 | Hudy | ............................... | 2/239 |
| 6,090,323 | A | * | 7/2000 | Izuhara et al. | ................ | 264/255 |
| 6,527,989 | B1 | * | 3/2003 | Onoda | ........................ | 264/40.1 |
| 6,837,746 | B2 | * | 1/2005 | Okamoto | ...................... | 439/606 |

FOREIGN PATENT DOCUMENTS

JP         8-250193         9/1996

* cited by examiner

*Primary Examiner* — Derris H Banks
*Assistant Examiner* — Tai Nguyen
(74) *Attorney, Agent, or Firm* — Gerald E. Hespos; Michael J. Porco (57) ABSTRACT

A device connector producing method includes a primary molding step of forming a primary molded body (20) formed with pilot holes (24), a terminal press-fitting step of press-fitting intermediate terminals (11) into the pilot holes (24) to form an intermediate product (40), and an insert molding step of setting the intermediate product (40) in a secondary molding die (50) and forming a device connector. The primary molded body (20) includes a resin inflow opening (21) that enables resin from a gate (52) to flow through the primary molded body (20) during secondary molding, and a supporting projection (23) to contact an inner surface of the secondary molding die (50). Thus, resin flow during secondary molding is good and the intermediate product (40) will not displace.

8 Claims, 6 Drawing Sheets

METHOD FOR PRODUCING A DEVICE CONNECTOR

BACKGROUND OF THE INVENTION

1. Field of the Invention

The invention relates to a device connector producing method, a device connector and a molding structure therefor.

2. Description of the Related Art

Japanese Unexamined Patent Publication No. 08-250193 discloses a connector assembly for supplying power to a device, such as a motor of an automotive vehicle. The device is accommodated in a case and the connector assembly is mounted to penetrate the case in inward and outward directions. More particularly, the connector assembly is used by fitting a connector from a power supply into an outer fitting recess and fitting a connector from the power consuming device, such as a motor, into an inner fitting recess.

The above-described device connector is produced by insert molding to form a housing with intermediate terminals embedded therein. An attempt could be made to produce a device connector with a thick part by only one insert molding. However, a defective product may be possibly produced due to air bubbles formed in the thick part or sinks formed on the outer surface thereof. Thus, an intermediate product typically is produced and includes intermediate terminals penetrating therethrough. The intermediate product then is set in a secondary molding die and insert molding is performed to produce the device connector.

The above-described intermediate product can be produced by insert molding or by forming a primary molded body by ordinary injection molding and then press-fitting the intermediate terminals into the primary molded body. Insert molding requires the intermediate terminals to be mounted manually one by one, and hence becomes time-consuming and costly if the number of intermediate terminals increases. On the other hand, a press fitting machine can be used at a relatively low cost to press fit the intermediate terminals into the primary molded body. Thus, producing an intermediate product by injection molding and terminal press-fitting is preferable.

The above-described method for producing the intermediate product by press-fitting the terminals requires forming pilot holes in the primary molded body and then press fitting the intermediate terminals into the pilot holes.

Some connectors require long intermediate terminals. An excessive force may act directly on these long intermediate terminals due to an injection pressure. Hence, the intermediate terminals may be broken or deformed. Additionally, the entire intermediate product may be displaced when the intermediate product is placed in the secondary molding die for insert molding if the intermediate terminals are press-fit insufficiently into the primary molded body. To prevent this problem, the pilot holes into which specific parts of the intermediate terminals can be press-fit to be held must be formed according to the lengths of the intermediate terminals.

The pilot holes are formed while injection molding the primary molded body by providing a primary molding die with core pins. Diameters of the core pins are smaller than the diameters of the intermediate terminals. Therefore, the core pins may be broken or deformed by injection molding pressure during the formation of the primary molded body. The problematic and costly breakage or deformation of the core pins is more probable as the intermediate terminals become narrower and longer. Thus, potential cost advantages achieved by press-fitting intermediate terminals into a primary molded body can be offset by costs associated with the breakage or deformation of long narrow core pins and costs associated with the above-described problems that occur during secondary molding around an intermediate product that has long narrow intermediate terminals.

The present invention was developed in view of the above situation and an object thereof is to enable a cost reduction and a productivity improvement.

SUMMARY OF THE INVENTION

The invention relates to a method for producing a device connector. The method comprises using a primary molding die for injection molding a primary molded body with at least one pilot hole. The method proceeds by arranging an intermediate terminal in the pilot hole of the primary molded body. The method continues by setting the primary molded body with the intermediate terminal therein in a secondary molding die and then injecting resin into the secondary molding die for embedding the primary molded body in the injected resin to form a connector. The step of embedding the primary molded body comprises setting at least one gate in the secondary molding die so that resin flows from an outer circumferential side toward an inner circumferential side of a portion of the connector. Additionally, the step of using a primary molding die for injection molding a primary molded body includes forming at least one resin inflow opening for receiving resin during secondary molding and forming at least one support. The step of forming the resin inflow opening includes forming the resin inflow opening at a position so that the resin from the gate of the secondary molding die flows through the resin inflow opening, and the step of forming the support includes forming the support to contact an inner surface of a cavity of the secondary molding die.

The above-described method improves the flow of the resin regardless of the size of the primary molded body because the resin from the gate can flow through the primary molded body via the resin inflow opening of the primary molded body during secondary molding. Further, the support of the primary molded body substantially contacts the inner surface of the cavity of the secondary molding die. Thus, injection pressure generated during secondary molding will not displace the primary molded body.

A mounting flange may be formed on the outer surface of the housing and may be mounted on an outer wall of a device in a liquid-tight manner by holding the mounting flange in close contact with the outer wall of the device via at least one seal. The step of molding the primary molded body preferably comprises forming the resin inflow opening at a position substantially corresponding to the mounting flange so that the resin from the gate of the secondary molding die flows through the resin inflow opening.

The step of arranging the intermediate terminal preferably comprises press-fitting the intermediate terminal into the pilot hole of the primary molded body.

The step of forming at least one pilot hole preferably comprises forming two pilot holes on a substantially straight line at opposite sides of the resin inflow opening.

The support preferably is formed to extend downstream of the resin flow from the gate at an inner position and preferably more inward than the mounting flange.

The above-described producing method assures that injection pressure generated during secondary molding will not displace the primary molded body. Therefore it is not necessary to increase the length of either the primary molded body or the core pins for forming the pilot holes even if the intermediate terminal is long. Accordingly, the method avoids the costs resulting from the breakage and deformation of the core pins.

The primary molded body preferably includes one or more sealant filling recesses if there are plural intermediate terminals. The sealant filling recesses each are in areas including a group of opening ends of a plurality of pilot holes for the respective intermediate terminals. The method then further includes a step of filling a sealant into the sealant filling recesses after the intermediate terminals have been arranged in the pilot holes and before the insert molding step. Accordingly, any clearances between the intermediate terminals and the resin filled during secondary molding reliably can be held liquid-tight by the sealant. Further, productivity is improved by sealing the plurality of intermediate terminals at once by one sealant filling step.

The primary molding die preferably includes a slide core for forming the resin inflow opening. The slide core preferably has one or more receiving holes for receiving the leading ends of core pins that form the pilot holes. Accordingly, the slide core stabilizes the leading ends of the core pins and further reduces the possibility of injection pressure breaking the core pins.

The invention a device connector that may be produced by the above-described method. The device connector preferably includes at least one intermediate terminal and a primary molded body with at least one pilot hole that receives the respective intermediate terminal. At least part of the primary molded body surrounded and supported by a unitary matrix of resin formed by insert molding to define a secondary molded body by insert molding. The primary molded body includes at least one resin inflow opening that extends from an outer peripheral surface toward an inner peripheral surface of a portion of the connector. The resin of the secondary molded body extends unitarily through the resin inflow opening. At least one support preferably projects unitarily from the primary molded body at a selected position relative to the resin inflow opening so that an end of the support is flush with a surface of the secondary molded body.

A mounting flange preferably is provided on the outer periphery of the housing and can be mounted on an outer wall of a device in a liquid-tight manner by holding the mounting flange in close contact with the outer wall of the device via at least one seal. The resin inflow opening preferably is at a position substantially corresponding to the mounting flange.

The invention also relates a molding structure for producing a device connector with at least one intermediate terminal, such as the above-described device connector. The molding structure includes a split primary molding die composed of two or more die members for forming a primary molded body. At least one of the die members includes at least one core pin for forming at least one pilot hole for receiving the respective intermediate terminal. The pilot hole extends to a resin inflow opening of the primary molded body. The molding structure also includes a secondary molding die into which the primary molded body having the intermediate terminal arranged therein is to be set for forming a connector in such a manner as to embed the primary molded body by injection molding. At least one gate is set in the secondary molding die so that resin flows from an outer peripheral side toward an inner peripheral side of a portion of the connector. The primary molded body includes the at least one resin inflow opening through which the resin for forming the portion flows at the time of secondary molding and at least one supporting projection. The gate is positioned so that the resin from the gate of the secondary molding die flows through the resin inflow opening of the primary molded body, and an inner surface of a cavity of the secondary molding die is held in contact with the supporting projection when the primary molded body is set in the secondary molding die.

The core pins preferably are paired to align on straight lines when the die members are closed. The die members preferably include a slide core for forming the resin inflow opening. The slide core is formed with one or more receiving holes for receiving the leading ends of the respective core pins.

The primary molding die preferably is configured to form one or more sealant filling recesses in at least one area including a group of opening ends of pilot holes for the intermediate terminals. Sealant can be filled at least partly into the respective sealant filling recesses.

The primary molding die and/or the secondary molding die may be configured to form a mounting flange on the outer peripheral surface of the housing. The mounting flange may be mountable in a liquid-tight manner with the outer wall of the device via at least one seal. The primary molded body may be shaped to have the resin inflow opening at a position substantially corresponding to the mounting flange so that the resin from the gate of the secondary molding die flows through the resin inflow opening.

The above-described invention achieves a cost reduction and a productivity improvement for a device connector produced with an insert molded an intermediate product including intermediate terminals.

These and other objects, features and advantages of the invention will become more apparent upon reading the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
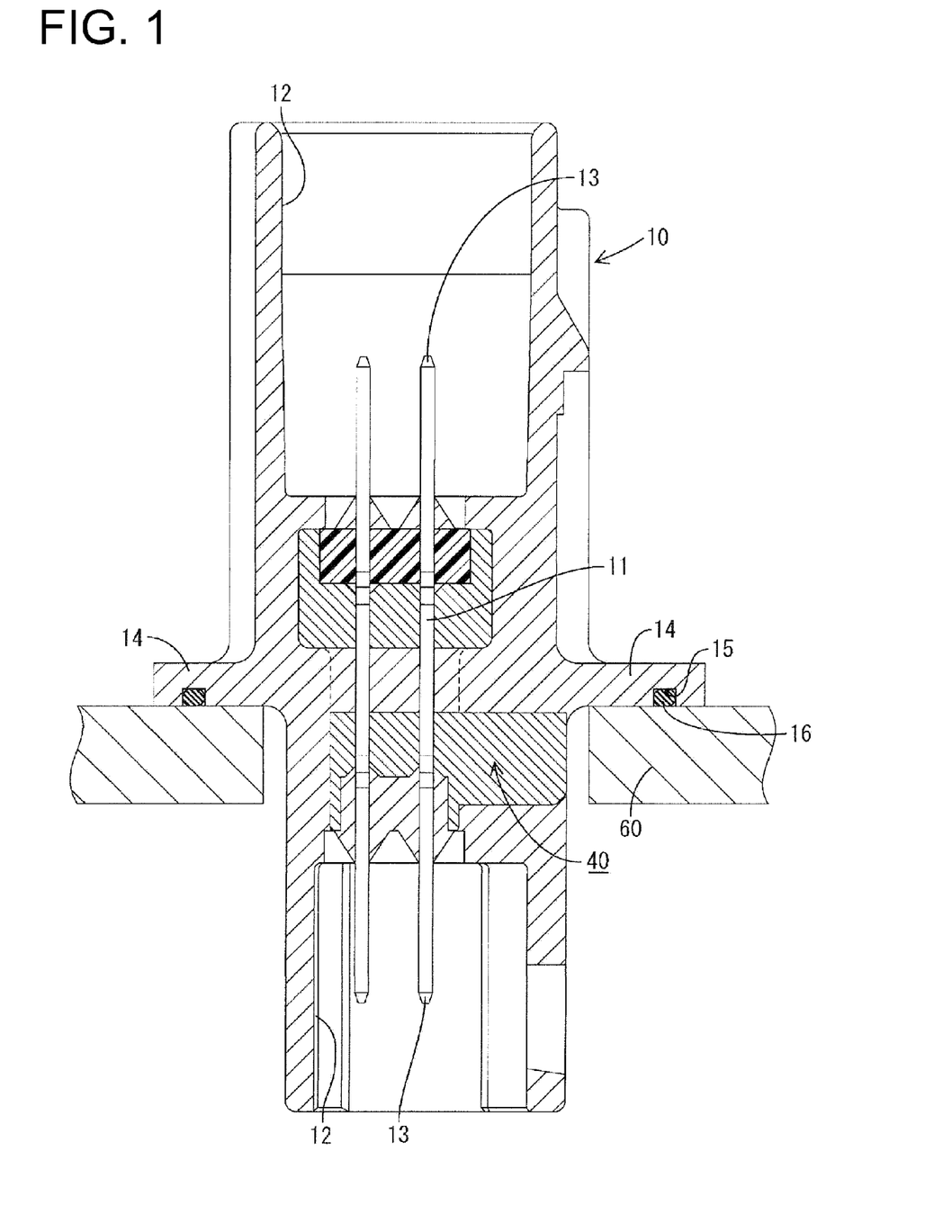
FIG. 1 is a side sectional view of a device connector of the invention.

A device connector according to the invention is illustrated in FIG. 1 and is for supplying power to a device, such as a motor of an electric car. In the following description, upper and lower sides of FIG. 1 are referred to respectively as upper and lower sides of the connector.

As shown in FIG. 1, the connector has a housing 10 made e.g. of synthetic resin and intermediate terminals 11 are in the housing 10. The housing 10 has a substantially rectangular outer shape and includes fitting recesses 12 at upper and lower ends. The intermediate terminals 11 are in a rectangular array (see FIG. 5), and are embedded in the housing 10 so that tabs 13 at the opposite ends thereof project into the respective upper and/or lower fitting recesses 12. A mounting flange 14 projects out at a substantially vertical central or intermediate position of the housing 10 and a sealing groove 15 is formed over substantially the entire periphery of the lower surface of the mounting flange 14. A seal ring 16 is mounted in the sealing groove 15 to seal between a case 60 of the device and the housing 10.

Figure 2:
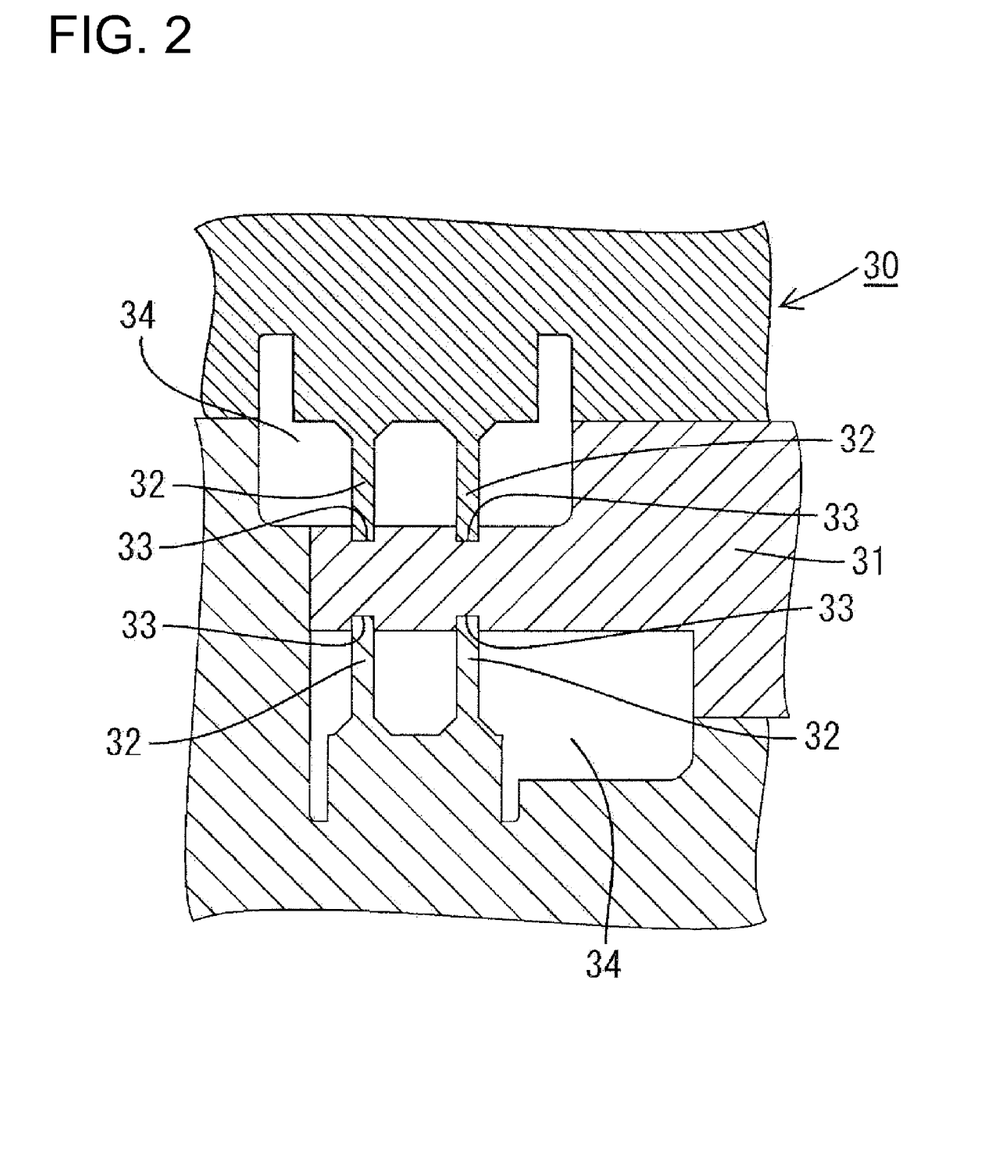
FIG. 2 is a side view in section of a primary molding die.

The connector is formed by injecting resin into a primary molding die 30 to form a primary molded body 20 of an intermediate product 40. As shown in FIG. 2, the primary molding die 30 is a split die composed of upper, lower and side die members. The upper and lower die members include core pins 32 for forming pilot holes 24 extending to a resin inflow opening 21 to be described later. The respective core pins 32 are paired to be substantially collinear when the upper and lower die members are closed. The side die member is a slide core 31 for forming the resin inflow opening 21 and has receiving holes 33 for receiving the leading ends of the respective core pins 32.

Leading ends of the core pins 32 are held in close contact with the receiving holes 33 when the primary molding die 30 is completely closed and molding resin is injected into a formed cavity 34. The die members are opened after the resin is cured to define the primary molded body 20 with the pilot holes 24 formed by the core pins 32.

Figure 3:
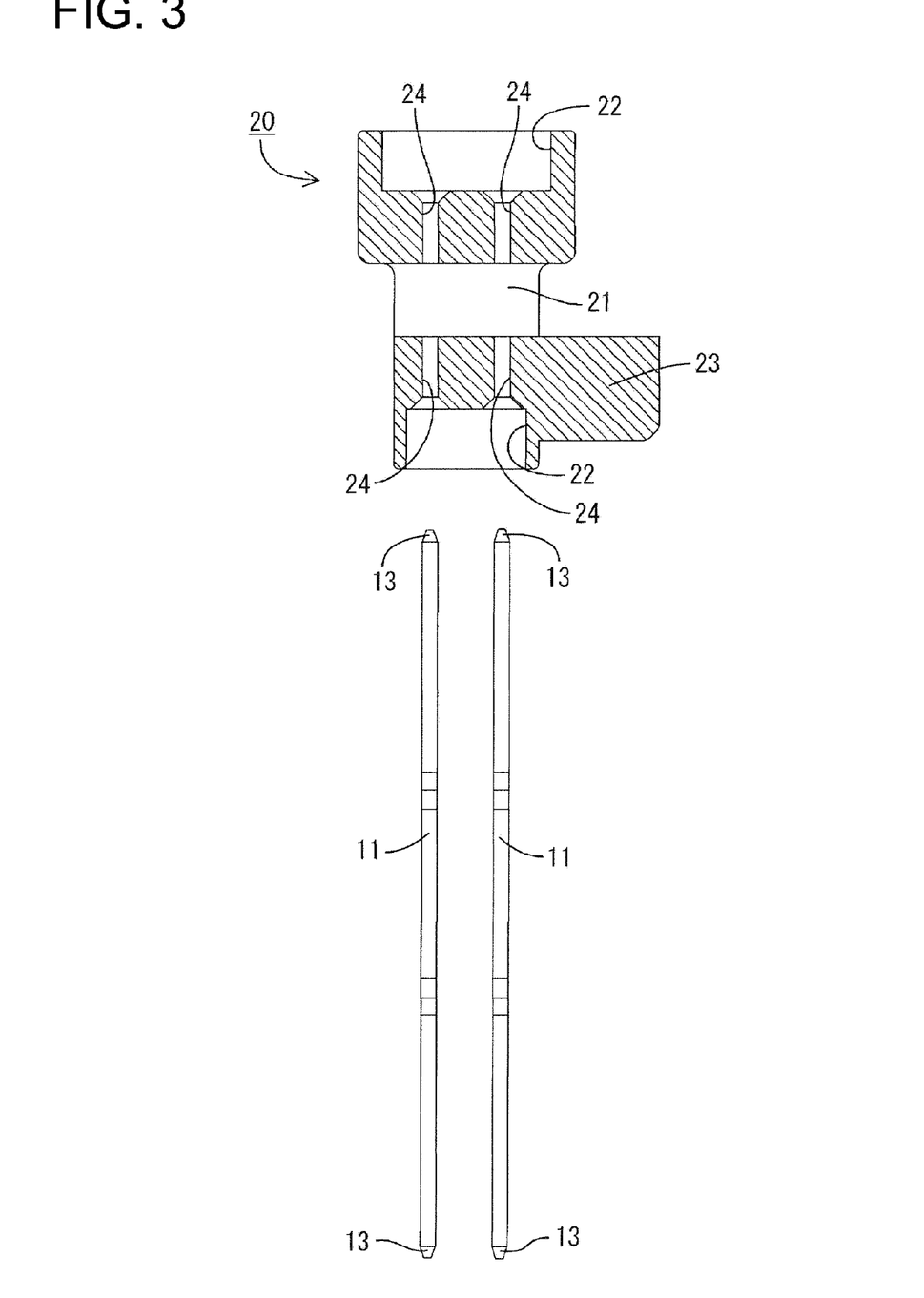
FIG. 3 is a side view of busbars before being press-fitted and a side view in section of a primary molded body.

As shown in FIG. 3, the resin inflow opening 21 is formed in a substantially middle part of the primary molded body 20 in a longitudinal direction and accommodates a flow of resin to form the mounting flange 14 during secondary molding to be described later. Sealant filling recesses 22 are formed at upper and lower ends of the primary molded body 20 and pilot holes 24 are formed at substantially equal intervals through the primary molded body 20 from one sealant filling recess 22 to the other.

A supporting projection 23 is formed at a part of the primary molded body 20 to the right of and below the resin inflow opening 21. The supporting projection 23 extends in a downstream direction of the flow of the resin from a gate 52 at the time of insert molding.

Figure 4:
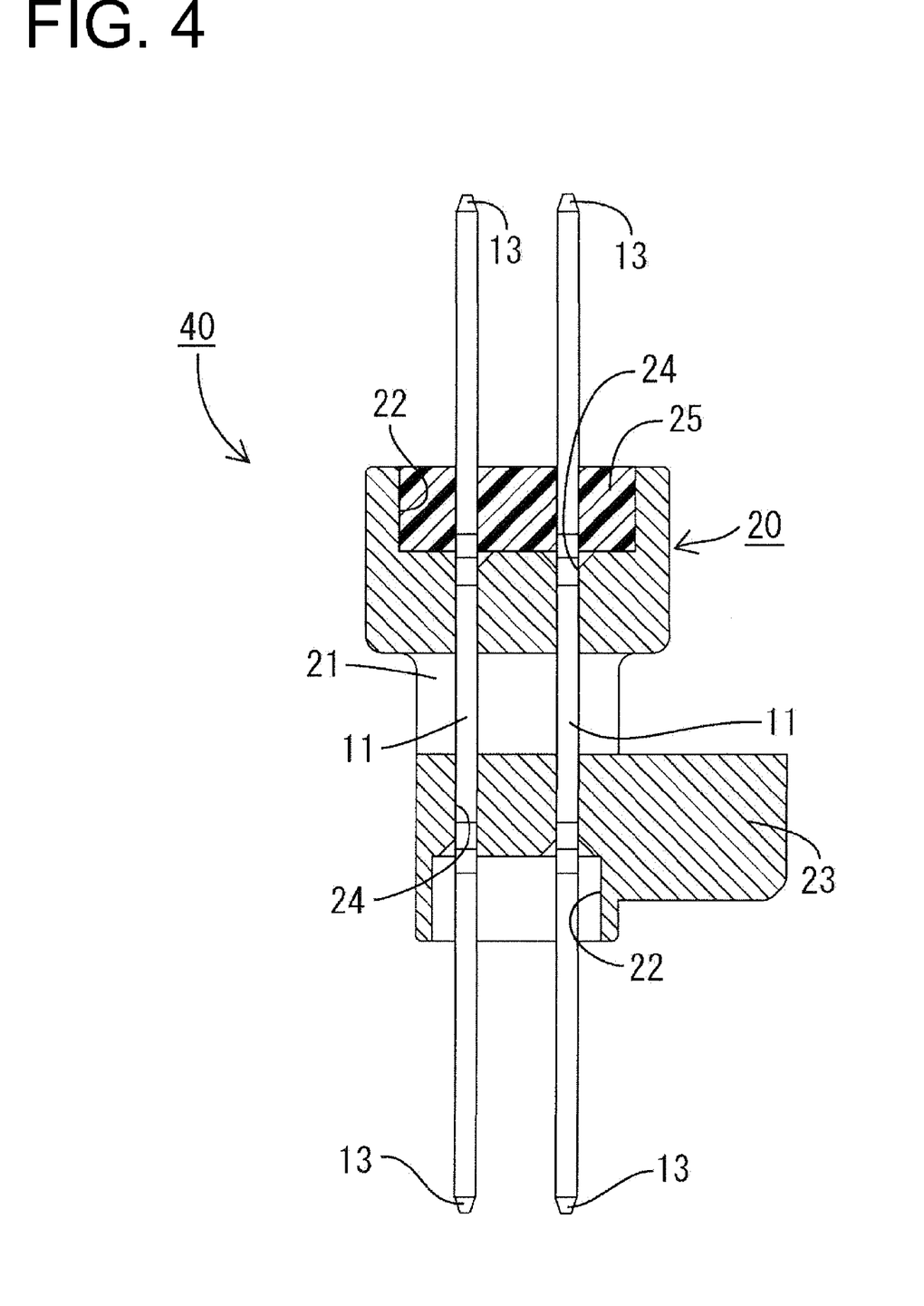
FIG. 4 is a side view in section of an intermediate product.
Figure 5:
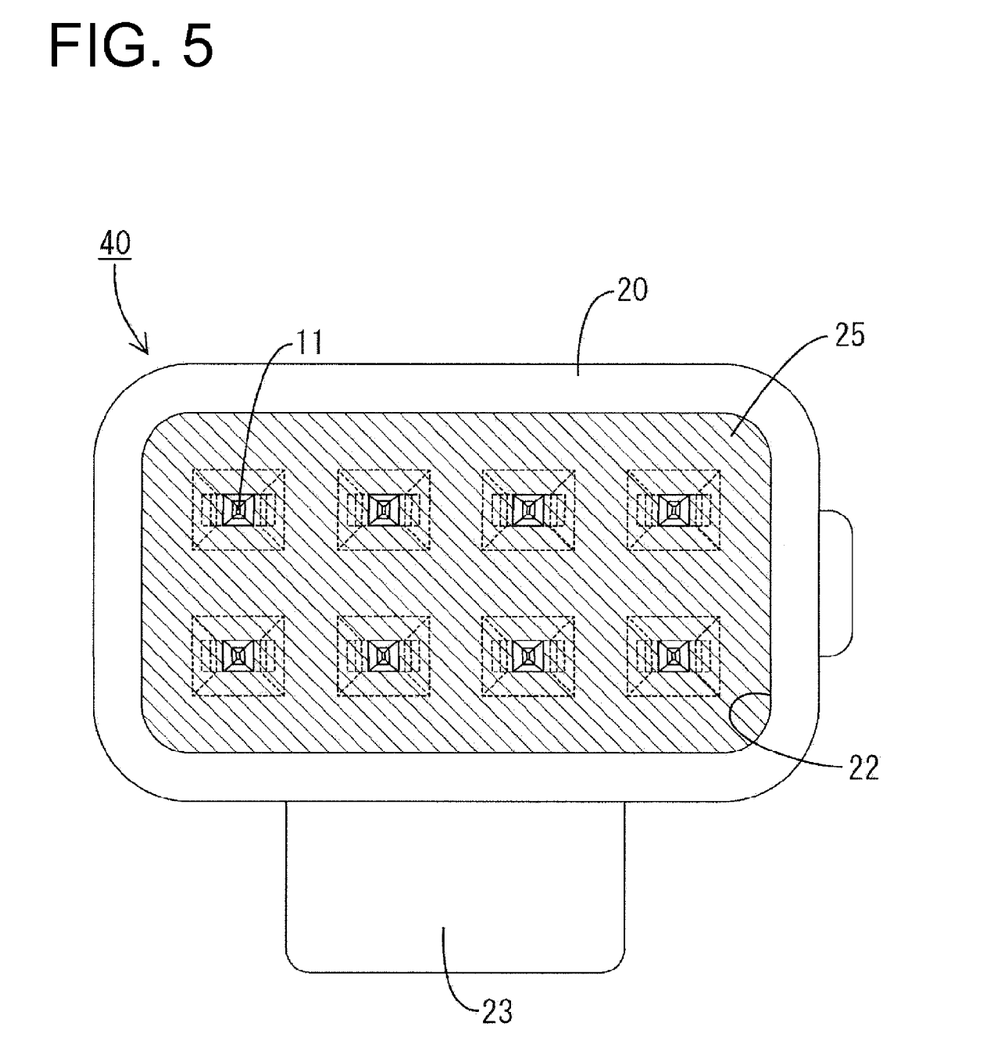
FIG. 5 is a front view of the intermediate product.

As shown in FIG. 4, the intermediate terminals 11 are press-fit by a specified length into the respective pilot holes 24 of the primary molded body 20 using a terminal press-fitting machine. Thus, the tabs 13 at the opposite ends of the intermediate terminals 11 project a specified distance from the respective sealant filling recesses 22 of the primary molded body 20. The primary molded body 20 is oriented so that one end faces up and a sealant 25 is poured to a specified depth into the sealant filling recess 22, for example, using a dispenser and is solidified. The primary molded body 20 then is reoriented (e.g. turned upside down) and the sealant 25 similarly is poured into and solidified in the other sealant fitting recess 22 to complete the production of the intermediate product 40. In this state, the intermediate terminals 11 are arrayed as shown in FIG. 5 when viewed from the front and the solidified sealant 25 adheres to the outer surfaces of the intermediate terminals 11.

The intermediate product 40 is mounted in the secondary molding die 50 (see FIG. 6) so that the supporting projection 23 touch an inner surface of a cavity 51 of the secondary molding die 50. The secondary molding die 50 then is substantially closed and insert molding is performed. The injected resin flows into the cavity 51 from a gate 52 provided at a position where the mounting flange 14 is to be formed and a part of the resin flows to the opposite side of the intermediate product 40 via the resin inflow opening 21 so that the resin fills the cavity 51. The split die is opened and a molded article is taken out after the resin in the cavity 51 is cured to complete the production of the device connector.

Figure 6:
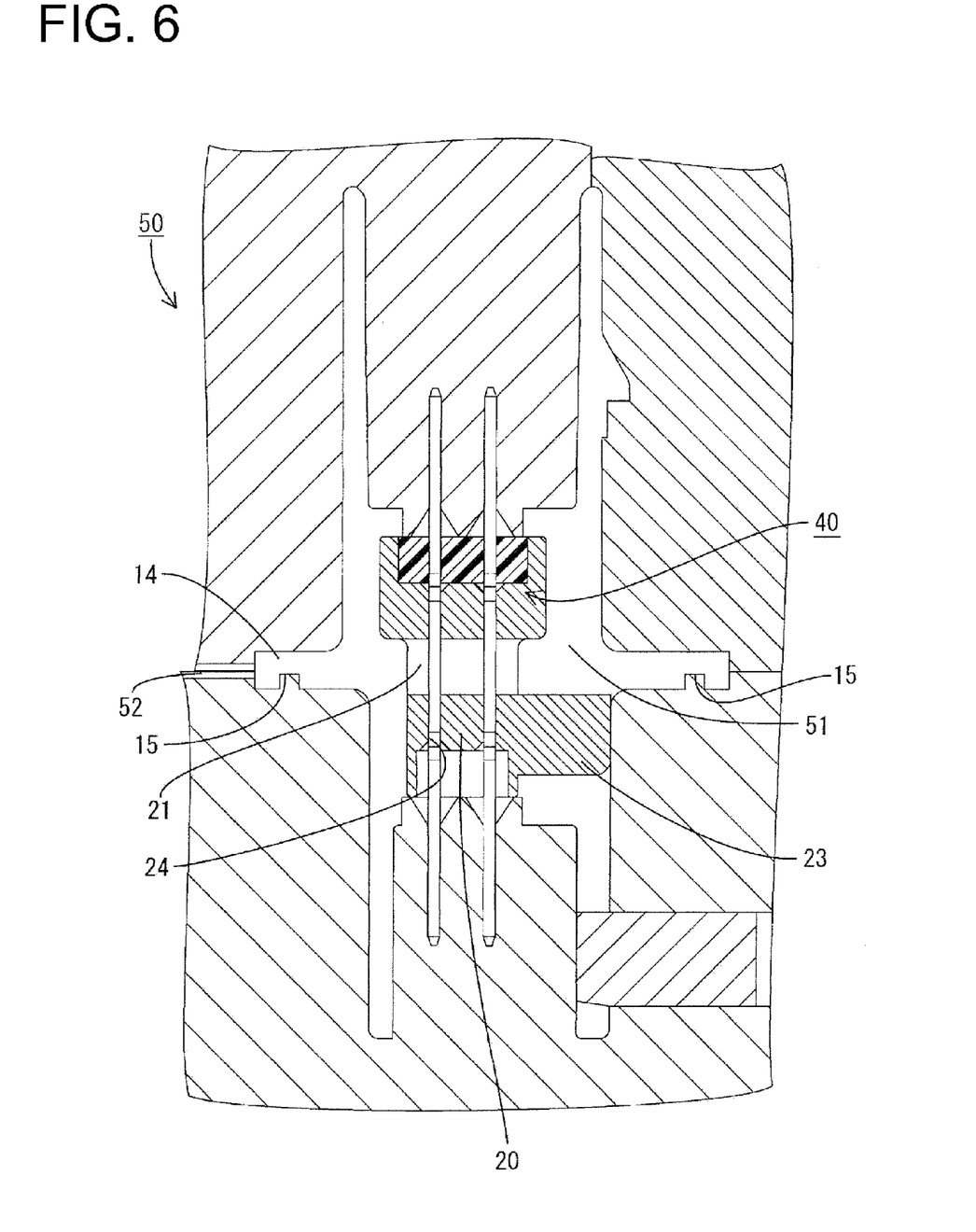
FIG. 6 is a side view in section of a secondary molding die with the intermediate product mounted therein.

The primary molded body 20 is formed with the resin inflow opening 21 that enables the resin to flow from the gate 52 to the side of the intermediate product 40 substantially opposite to the gate 52. Thus, problems of poor resin flow around the intermediate product 40 can be solved. A part of the resin injected into the cavity 51 from the gate 52 collides with the intermediate product 40 with significant force despite the presence of the resin inflow opening 21. However, the primary molded body 20 particularly is formed with the supporting projection 23 that contacts the inner surface of the cavity 51. Thus, the supporting projection 23 receives pressure caused by resin colliding with and acting on the intermediate product 40. Accordingly, injection pressure of the resin will not displace the intermediate product 40. The above-described aspects of the invention significantly reduce a ratio of defective products.

By forming the resin inflow opening 21 in the primary molded body 20, the pilot holes 24 need not be formed by core pins continuously extending from one longitudinal end to the opposite end of the primary molded body 20 and the pilot holes 24 can be formed in a separate manner. This is because no pilot holes need to be formed in the resin inflow opening 21, and the longitudinal dimensions of the core pin portions 32 can be suppressed to or below half the conventional lengths. Thus, the lengths of the core pins can be shortened and holding forces thereof onto the die main body and the rigidity thereof can be increased, wherefore an occurrence rate of deformation and breakage of the core pin portions 32 by the injection pressure can be reduced and the die can last longer.

The slide core 31 for forming the resin inflow opening 21 is formed with the receiving holes 33 for receiving the leading ends of the core pins 32. Thus, the leading ends of the core pins 32 are received by the slide core 31 in the cavity 51 and the core pins 32 are held at both ends in the cavity 51. Therefore, the core pins 32 are difficult to deform or break even if subjected to a strong pressure from the injected resin in the cavity 51 during secondary molding.

If secondary molding is performed with the supporting projection 23 held in contact with the inner surface of the cavity 51, clearances may be formed in boundary sources with the supporting projection 23 in the outer surfaces of the housing 10. However, the supporting projection 23 is downstream of the gate 52 and inwardly of the case or casing 60 of the device. Thus, watertightness is ensured despite the clearances formed because of the presence of the supporting projection 23.

The present invention is not limited to the above described and illustrated embodiment. For example, the following embodiments are also included in the technical scope of the present invention.

The primary molded body 20 may not be formed with the sealant fitting recesses 22 in areas each including a group of open ends of the pilot holes 24 corresponding to a plurality of intermediate terminals 11. For example, the sealant 25 may be poured into clearances after the intermediate terminals 11 are arranged in the primary molded body 20 without providing sealant fitting recesses 22 and/or the sealant 25 may be applied to the intermediate terminal 11 using a brush or the like and fixed by the resin at the time of secondary molding.

The sealant filling recess 22 may be formed for each intermediate terminal 11. For example, a part (e.g. in the form of a counterbore) for forming the sealant filling recess 22 may be provided integral or unitary to the core pin 32 for forming the pilot hole and the sealant 25 may be filled for each intermediate terminal 11.

The slide core 31 may not have the receiving holes 33 for receiving the leading ends of the core pins 32 to form the pilot holes 24. For example, the pilot holes 24 may not be through holes and the intermediate terminals 11 may be inserted into the pilot holes 24 using a guide and press-fit while being pierced through the solid resin part. In this case, the slide core 31 need not be formed with the receiving holes 33.

What is claimed is:

1. A method for producing a device connector comprising:
    injecting resin into a primary molding die to form a primary molded body (20) with at least one pilot hole (24), at least one resin inflow opening (21) through the primary molded body (20) and at least one supporting projection (23);
    arranging at least one intermediate terminal (11) in the pilot hole (24) of the primary molded body (20) to form an intermediate product (40);
    providing a secondary molding die (50) with a cavity (51) and at least one resin inflow gate (52) communicating with the cavity (51);
    placing the intermediate product (40) in the secondary molding die (50) so that the supporting projection (23) contacts an inner surface of the cavity (51) and so that the resin inflow opening (21) substantially aligns with the gate (52); and
    injecting resin through the gate (52) and into the cavity (51) so that the resin flows through the resin inflow opening (21) to form a housing (10) with a unitary matrix of the resin surrounding at least part of the intermediate product (40) and passing through the intermediate product (40).

2. The method of claim 1, wherein the step of providing a secondary molding die (50) comprises providing a secondary molding die (50) with a recess to define a mounting flange (14) projecting out on the housing (10) for mounting the housing (10) on an outer wall (60) of a device, the gate (52) being in the recess.

3. The method of claim 2, wherein the step of injecting resin through the gate (52) and into the cavity (51) comprises injecting the resin into the recess and through the resin inflow opening (21).

4. The method of claim 2, wherein the step of placing the intermediate product (40) into the secondary molding die (50) so that the supporting projection (23) contacts an inner surface of the cavity (51) comprises placing the supporting projection (23) to extend in a downstream direction of a flow of the resin from the gate (52) and at a position substantially adjacent the recess that the mounting flange (14).

5. The method of claim 1, wherein the step of arranging at least one intermediate terminal (11) in the pilot hole (24) comprises press-fitting the intermediate terminal (11) into the pilot hole (24) of the primary molded body (20).

6. The method of claim 1, wherein the at least one pilot hole (24) comprises plural pilot holes (24) arranged in pairs with the pilot hole (24) in each pair being on opposite sides of the resin inflow opening (21).

7. The method of claim 1, wherein the primary molded body (20) includes at least one sealant filling recess (22) adjacent the pilot hole (24), the method further comprising filling a sealant into the sealant filling recesses (22) after arranging the intermediate terminal (11) in the pilot hole (24) and before placing the intermediate product (40) in the cavity (51).

8. The method of claim 1, wherein the primary molding die includes a slide core (31) for forming the resin inflow opening (21) and at least one core pin (32) for forming the pilot hole (24), the slide core (31) including at least one receiving hole (33), the method further including supporting a leading end of the core pin (32) into the receiving hole (33) prior to injecting the resin into the primary molding die.

\* \* \* \* \*